United States Patent [19]

Willard et al.

[11] Patent Number: 4,950,147

[45] Date of Patent: * Aug. 21, 1990

[54] DIVIDING AND ROUNDING MACHINE

[75] Inventors: Mark L. Willard, Plymouth; David E. Beatty, Wrenshall, both of Minn.; Jeffery A. Nyguist, Superior, Wis.

[73] Assignee: Dutchess Bakers' Machinery Company, Inc., Superior, Wis.

[*] Notice: The portion of the term of this patent subsequent to Feb. 6, 2007 has been disclaimed.

[21] Appl. No.: 346,565

[22] Filed: May 1, 1989

Related U.S. Application Data

[63] Continuation-in-part of Ser. No. 217,657, Jul. 12, 1988, Pat. No. 4,898,528.

[51] Int. Cl.[5] .......................... A21C 3/10; A21C 5/08
[52] U.S. Cl. .................... 425/185; 425/186; 425/189; 425/297; 425/298; 425/332
[58] Field of Search .............. 425/185, 186, 189, 297, 425/298, 300, 332, 292, 295, 181, 182, 192 R, 193, 318, 196, DIG. 109, DIG. 248

[56] References Cited

U.S. PATENT DOCUMENTS

| 1,150,655 | 8/1915 | Bertram | 425/332 |
|---|---|---|---|
| 1,177,835 | 4/1916 | Van Houten | 425/300 |
| 1,352,424 | 9/1920 | Abrams et al. | 425/300 |
| 1,752,107 | 3/1930 | Plater | 425/196 |
| 1,764,586 | 6/1929 | Van Houten | 425/332 |
| 1,954,443 | 4/1934 | Doolin | 425/196 |
| 2,094,289 | 9/1937 | Blum et al. | 425/298 |
| 2,137,811 | 11/1938 | Royal | 425/298 |
| 2,158,594 | 5/1939 | Seem | 425/332 |
| 2,214,475 | 9/1940 | Napolillo | 425/182 |
| 3,521,578 | 7/1970 | Fraiolo, Sr. | 425/193 |
| 3,669,605 | 6/1972 | Reilly | 425/398 |
| 4,150,931 | 4/1979 | Gabrys | 425/192 R |
| 4,167,381 | 9/1979 | Hilmoe | 425/182 |

Primary Examiner—Jeffery Thurlow
Assistant Examiner—Mathieu Vargot
Attorney, Agent, or Firm—Paul L. Sjoquist

[57] ABSTRACT

A dough-dividing and rounding machine for dividing and rounding dough wherein the machine includes a removable ring and dividing assembly for the convenient cleaning of the machine and to allow for the interchangeability of the dividing assembly with other dividing assemblies for the production of dough or similar materials having different weights, quantities or shapes. The present invention being particularly adapted for use in dividing and/or dividing and rounding machines wherein a predetermined quantity of pieces of equalsized dough or the like are produced.

21 Claims, 7 Drawing Sheets

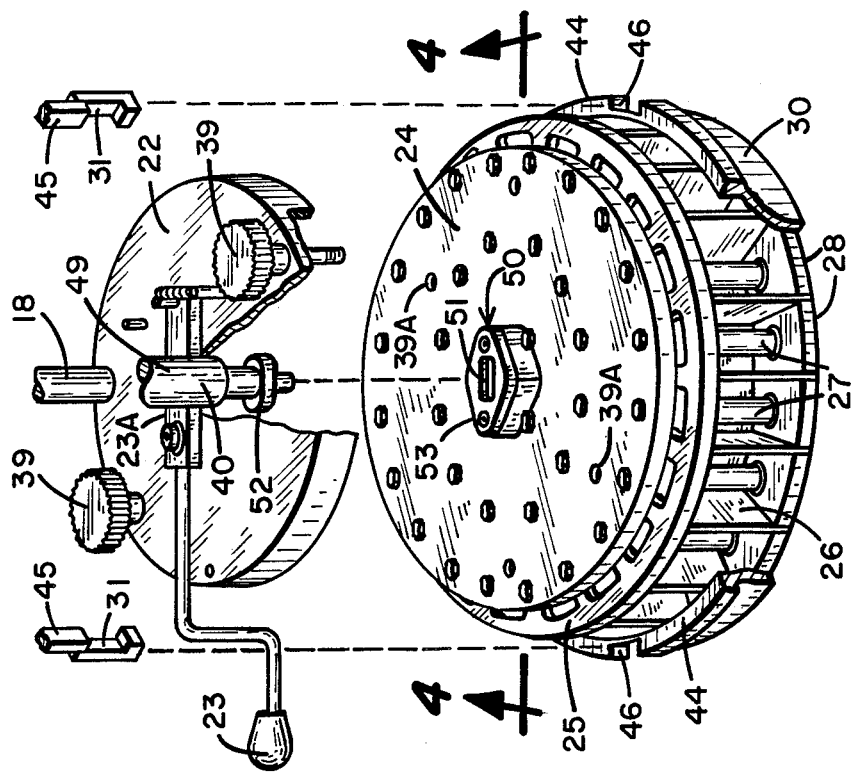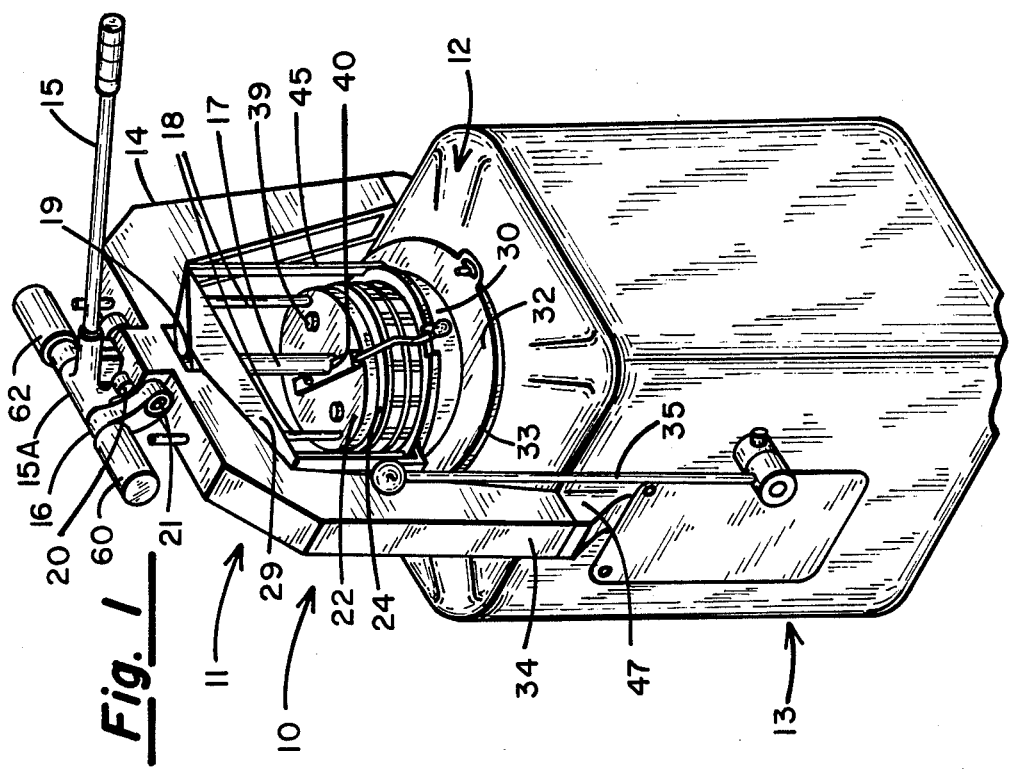

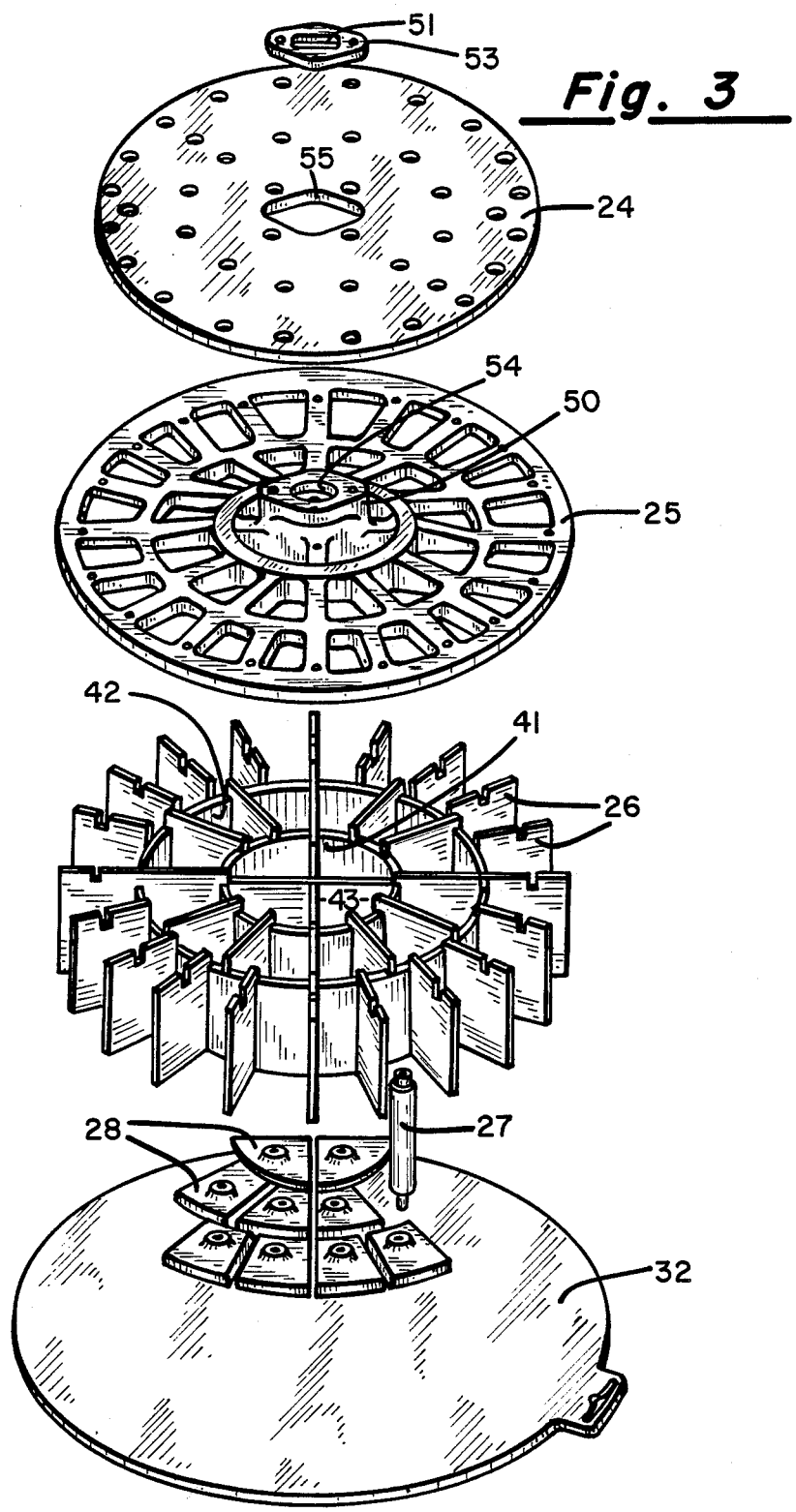

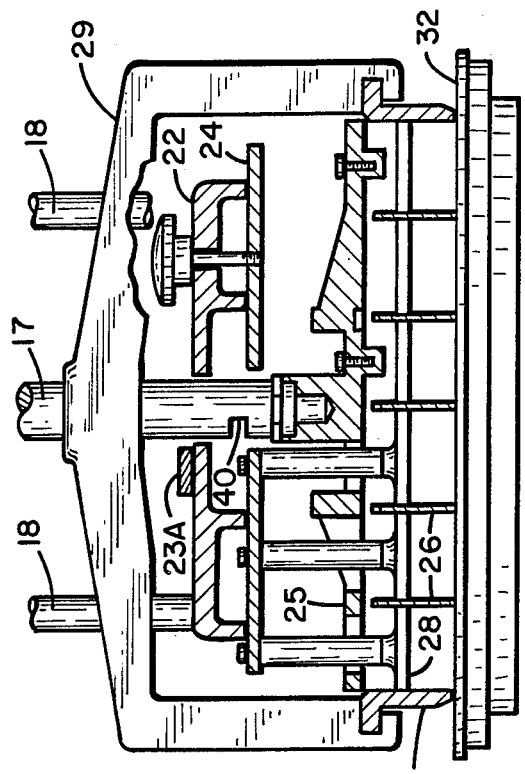
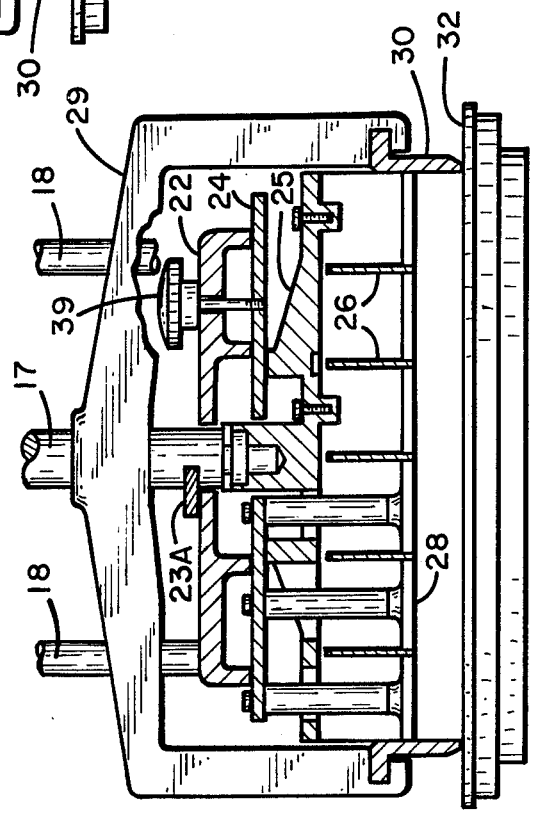

DIVIDING AND ROUNDING MACHINE

BACKGROUND OF THE INVENTION

This is a continuation-in-part of U.S. application Ser. No. 217,657, filed July 12, 1988, now U.S. Pat. No. 4,898,528.

The present invention relates generally to the art of handling materials such as bread dough, cookie dough, and other similar food products for human consumption but not limited to food products, for example, toys, pharmaceuticals, chemicals, plastics, and in other industries using materials of a consistency similar to dough and more particularly to a machine for dividing and/or rounding dough.

Dough-dividing and rounding machines have been used in the baking industry for many years. Many of these machines were originally designed forty or fifty years ago and are commonly constructed of cast iron and weigh 600 pounds or more. Many of these devices are available today only because they were on the market prior to the present health and safety regulations. Examples of such devices are manufactured by Dutchess Bakers, Machinery Company, Inc. of Superior, Wis. and Seewer Rondo, Inc. of Hackensack, N.J.

Examples of several of the earlier dough-dividing machines which are actually predecessors to the present invention may be found with reference to U.S. Pat. No. 1,177,835, issued Apr. 4, 1916; U.S. Pat. No. 1,764,586, issued June 17, 1930; and U.S. Pat. No. 2,158,594, issued May 16, 1939. The general structure and operation disclosed in these prior art patents is still found in similar machines in use today.

These machines are very durable; however, their versatility and ability to be thoroughly cleaned leave much to be desired. A common problem with these prior machines is that the dividing assembly must be cleaned while it is mounted on the machine. Some of these machines allow the top section of the machine to be tilted for access to the dividing assembly, however, due to the weight of the top section of the machine, even this is not an easy task. Presently, most manufacturers recommend cleaning the dividing assembly using clean rags and an air hose. Unless the operator is very conscientious and thorough, it is not uncommon for dough residue to remain on the dividing assembly for long periods of time and thereby provide an environment which promotes the growth of harmful bacteria or insects. The alternative would be to dismantle the entire machine. This requires tools and mechanical skills not commonly found in most bakery shops.

Another important drawback with the presently available machines is that if the operator wishes to divide or round other sizes or quantities of dough beyond or below the limitations of the machine being used, another machine specifically designed for the dividing or rounding of the new size or quantity of dough must be purchased. For example, if an operator is presently using a 36-part divider rounder machine capable of dividing and rounding dough pieces in weights from 1 ounce to 3 ounces, and would like to increase the production by requiring larger dough pieces in weight, a different machine must be purchased. Or, if an operator is presently using an 18-part divider rounder machine capable of dividing and rounding dough pieces ranging in weight from 3 ounces to 6 ounces, and wishes to make the dough pieces either smaller than the 3 ounce limit or larger than the 6 ounce limit, one or more additional machines would be required to be purchased.

The present invention represents a major advance in the dough-dividing and rounding industry. The present invention provides a dividing assembly which may be quickly and easily removed from the machine for cleaning or being interchanged with a different dividing assembly. Other dividing assemblies are also part of the present invention and will include multiple dividing assemblies to enable the operator to clean one dividing assembly without having to discontinue production. Additionally, the operator may change size quantity or type of product being processed within a few minutes by changing the dividing assembly to a new dividing assembly, pressing assembly or pattern impression assembly.

A limited number of patents have been found which may broadly relate to the present invention. One such patent is U.S. Pat. No. 1,954,443, issued to Doolin on Apr. 10, 1934. The Doolin patent discloses a dough-dispensing and cutting device wherein the dough is fed through a pipe into a hollow machine head. The dough is then squirted from the machine head and cut into strips by a cutting ring. A feature of the Doolin patent is the use of a removable plate to allow for cleaning of the inner surface of the machine head.

U.S. Pat. No. 3,521,578, issued to Fraioli on July 21, 1970, discloses a conveyor-operated rounding and molding machine. The Fraioli patent is directed to a rounding device wherein dough balls of various sizes and shapes may be made. The Fraioli device requires that a divider or other type of dispenser feed the dough into the channels prior to the rounding operation.

U.S. Pat. No. 1,150,655, issued to Bertram on Aug. 17, 1915, discloses a dough-dividing and working machine wherein the table for holding the dough has recesses to assist in the shaping and forming of the dough.

U.S. Pat. No. 1,352,424, issued to Abrams, et al, on Sept. 14, 1920, discloses a divider machine which may be disassembled for cleaning, by removing a number of screws which hold various portions of a blade housing together.

U.S. Pat. No. 2,094,289, issued to Blum, et al, on Sept. 28, 1937, discloses a dough-dividing and rounding machine having an oscillating table for imparting a gyrating motion for purposes of rounding the dough, and discloses the mechanical linkages associated therewith.

SUMMARY OF THE INVENTION

An advantage of the present invention is that it provides a readily removable dividing assembly for easy cleaning and maintenance of the dividing assembly without requiring special tools or skills to remove the dividing assembly from the machine.

Another advantage of the present invention is that the dividing assemblies are interchangeable to provide a dividing and rounding machine which is adaptable for dividing dough into a variety of shapes or sizes.

Another advantage of the present invention is that the dividing assembly may be used on dividing machines and on dividing and rounding machines.

The general operation of a dividing and rounding machine for dividing and rounding dough is described herein to provide an understanding of the overall invention. Although the operation of the present invention is discussed in the context of the operation of the dividing and rounding machine, it should be understood that a dividing machine operates in the same general manner and the discussion herein is applicable to both types of machines. Additionally, the operation of the present invention is described as it applies to the dividing and rounding of bread dough and it should be understood that the material to be divided and/or rounded may be nearly any material which has the general consistency of dough.

Initially, a piece of the dough to be divided, flattened, cut and/or shaped, is placed on a pallet and flattened to a circumference generally indicated by markings on the pallet. The pallet is then placed on the crank plate of the dividing and rounding machine. The present invention includes a single operating lever which, when lowered, rotates along a two point pivot linkage to lower the various parts of the dividing assembly. The initial movement of the operating lever causes the entire dividing assembly to move downwardly toward the pallet. Further movement of the operating lever causes a ring to contact the pallet and circumferentially enclose the dough. As the lever is lowered further, the false bottom of the dividing assembly contacts the dough and flattens the dough evenly on the pallet within the ring. Once the dough is evenly spread out on the pallet, a trip lever is sprung to release the knives from the dividing assembly. Further movement of the operating lever will then move the knives beyond the false bottom of the dividing head assembly to slice and divide the dough. Once the dough has been satisfactorily divided, the operator then begins the rounding process by moving the rounding lever to activate motion created by eccentricity in the crankshaft and crank plate. The crank plate then eccentrically rotates to round the previously divided dough.

A feature of the present invention is the use of a slotted ring to allow for the removal of the ring from the ring yoke. The initial movement of the operating lever is transferred to the dividing assembly through the drive rack and a pair of glides. Further movement of the operation lever causes the ring to contact the pallet. Once the ring is lowered to contact the pallet, the ring is rotated to align a pair of grooves on the ring with the slotted arms on the ring yoke. The operating lever and dividing assembly are then returned to their original position and the ring is removed.

A further feature of the present invention is the use of a two-piece drive rack to allow for the removal of the dividing assembly from the dividing and rounding machine. Once the ring is removed, the dividing assembly is once again lowered and a pair of turn knobs are unscrewed to allow the dividing assembly to be separated from the trip plate. Once the turn knobs are loosened, the dividing assembly is held in place by the two-piece drive rack. The dividing assembly is then rotated one-fourth turn to disengage the lower section of the drive rack from the upper section of the drive rack. Once this is completed, the operating lever and trip plate are returned to their original position and the dividing assembly is removed from the dividing and rounding machine.

An object of the present invention is to provide a dividing and rounding machine which will easily allow the user to meet government sanitation regulations and industry requirements.

A further object of the present invention is to provide a dividing and rounding machine wherein the entire dividing assembly may be readily removed for cleaning or maintenance.

A further object of the present invention is to provide a dividing and rounding machine wherein the entire dividing assembly may be readily interchanged with other dividing assemblies to allow the dough to be divided into different sizes and weights without purchasing an entirely new machine.

BRIEF DESCRIPTION OF THE DRAWINGS

FIG. 1 is a perspective view of a dividing and rounding machine constructed in accordance with the present invention;

FIG. 2 is a perspective view of the ring, dividing assembly and drive rack of the present invention;

FIG. 3 is an exploded perspective view of the dividing assembly and pallet of the present invention;

FIG. 8A is a partial cross-sectional view of the ring and divider assembly in a first dough compression position; and FIG. 8B is a partial cross-sectional view of the ring and divider assembly in a second dough-dividing position.

DETAILED DESCRIPTION OF THE PREFERRED EMBODIMENT

Figure 4:
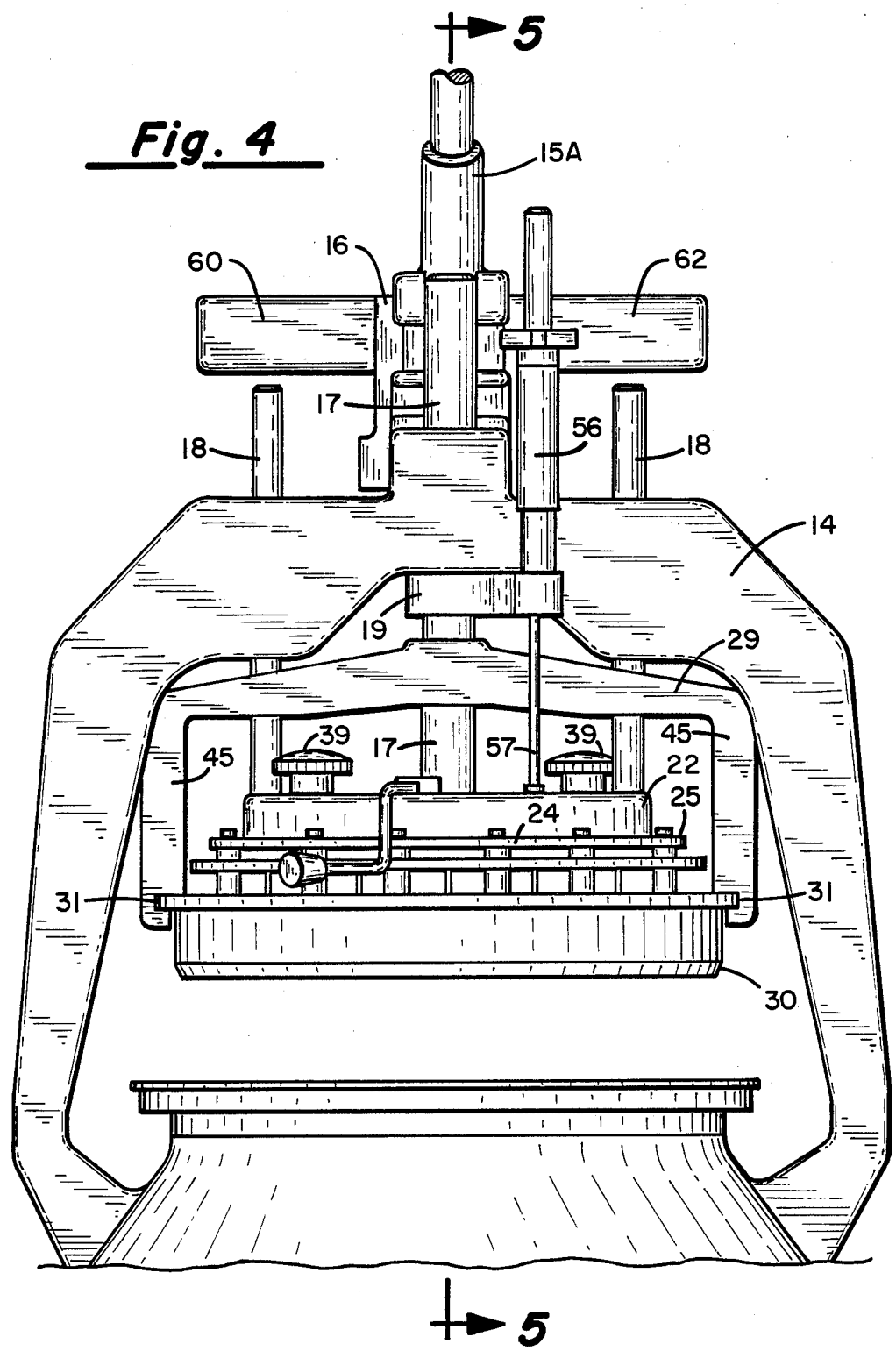
FIG. 4 is a front elevation view of the upper portion of a dividing and rounding machine constructed according to the invention.

The present invention is known in the baking industry as a dividing and rounding machine and is referred to herein generally as 10. The dividing and rounding machine 10 consists generally of an upper yoke section 11, a dividing and rounding section 12, and a base section 13. The upper yoke section 11 is preferably constructed of a sturdy metal and provides the leverage necessary for the operation of the dividing and rounding machine 10. The upper yoke section 11 includes as its primary components, an upper yoke 14, an operating lever 15, a pivot bracket 16, a drive rack 17, a pair of glides 18, and a ring pivot mechanism 19.

The operating lever 15 is essentially an elongate lever which provides leverage for the movement of the various components in the dividing and rounding section 12. The inner end of the operating lever 15 is mounted to a holder 15A which is connected to the pivot bracket 16. The drive rack 17 is preferably of a two-piece construction having an upper section 49 and a lower section 50. The upper section 49 is pivotally attached at its top end to the first pivot pin 20 of the operating lever holder 15A. The upper section 49 of the drive rack 17 extends downwardly through the upper yoke 14, the ring pivot mechanism 19 and the trip plate 22 to releasably engage the lower section 50 of the drive rack 17. The lower section 50 of the drive rack 17 consists of a boss projecting upwardly from knife plate 25, together with a cap 53 affixed over the top of the projecting boss. The boss has an interior circular recess 54 which has a diameter slightly larger than the longest dimension of cross key 52, and cap 53 has a locking slot 51 sized to accept the insertion of cross key 52. Cross key 52 is formed at the bottom of the drive rack upper section 49. Plug plate 24 has an opening 55 which is shaped to conform to drive rack lower section 50, but is sized larger to permit the insertion and removal of drive rack lower section 50 through the opening 55. The components are sized so that cross key 52 may be inserted through locking slot 51 and into the interior recess 54 of boss 50. The plug plate 24 may then be rotated one-quarter turn relative to drive rack 49 to engage and lock cross key 52 transverse to slot 51. When cross key 52 is placed in this transverse locking position, turn knobs 39 may then be threadably fastened into threaded holes 39A. The glides 18 extend downwardly through the upper yoke 14 and ring yoke 29 to engage the top surface of trip plate 22. The ring pivot mechanism 19 is attached to the drive rack 17 upper section 49, and has a rearwardly extending arm which supports a suspension bracket 63. Suspension bracket 63 supports a ring yoke lever 58 which is pivotally attached to the ring yoke 29.

The bottom arms 34 of the upper yoke 14 are directly attached to the frame 47 of the dividing and rounding machine 10 to support the components of the dividing assembly mechanism above the base section 13.

The dividing and rounding section 12 is preferably constructed of aluminum, stainless steel, and/or plastic components and includes a trip plate 22, a trip lever 23 connected to a trip bar 23A, a plug plate 24, a knife plate 25, knife blades 26, plug stems 27, plugs 28, pallet 32, and crank plate 33. The trip plate 22 includes a trip lever 23, trip bar 23A, and turn knobs 39. The glides 18 extend downwardly from the upper yoke 14 and attach directly to the top surface of trip plate 22. The trip bar 23A releasably engages or disengages the trip groove 40 on the upper section 49 of the drive rack 17. The plug plate 24 is located immediately below the trip plate 22 and is releasably attached to the trip plate 22 by the turn knobs 39.

Presently, the plug plate 24 and knife plate 25 include a large number of individual plugs 28 and knife blades 26, respectively, which are attached to the lower surface of each plate. It is readily anticipated that the plug plate 24 and/or the knife plate 25 may be made of a single piece construction to eliminate the need for the large number of individual pieces which are presently manually attached to each plate. Additionally, the removability of the plug plate 24 and knife plate 25 allow the operator to create specialty pieces for holidays or other special occasions by using a plug plate 24 and knife plate 25 combination configured to create designs such as hearts, snowmen or Christmas trees. Once production of the specialty pieces is completed, the desired dividing assembly may be reinstalled in the dividing and rounding machine 10.

The plug stems 27 extend downwardly from the plug plate 24 and pass through openings in the knife plate 25 to hold the knife plate 25 releasably aligned with the plug plate 24. The plug stems 27 hold the plugs 28 a fixed distance from the plug plate 24 and in alignment with the knife plate 25 so that the knife blades 26 fit between the respective plugs 28. The knife blades 26 extend downwardly from the knife plate 25 in a fixed pattern to create openings between the respective knife blades 26 having the same identical volume. The knife blades 26 are held in place by screws and an inner ring 41, an outer ring 42 and cross members 43. The knife blades 26, inner ring 41, outer ring 42 and cross members 43 fit between the spaced apart plugs 28 to form a generally flat false bottom surface during the dough compression operation of the dividing and rounding machine 10. Once the trip bar 23A is released from the trip groove 40, the knife plate 25, and the knife blades 26 are released and extend beyond the spaced-apart plugs 25 to divide the dough.

The ring yoke 29 is a generally U-shaped structure which extends downwardly beneath the ring-pivot mechanism 19 to bridge the dividing and rounding section 12. The arms 45 of the ring yoke 29 are generally adjacent to the outer surface of the trip plate 22 and plug plate 24. The arms 45 include a pair of ring grooves 31 near their lower surface to retain the ring 30 during the dividing and rounding procedure. Ring 30 includes an outer rim 44 and a pair of ring slots 46 along its top, outer surface. Ring 30 is positioned so as to generally encircle the plug plate 24 and knife plate 25.

Finally, the base section 13 of the dividing and rounding machine 10 consists generally of a frame 47, a rounding lever 35, a motor (not shown), and a variable crankshaft (not shown). The rounding lever 35 is attached to one side frame 47 and operates to engage the motor with variable crankshaft to eccentrically rotate the crank plate 33.

FIG. 4 shows a front elevation view of the upper portion of the invention. Upper yoke 14 supports and generally guides the moving components of the invention. For example, drive rack 17 is slidably guided through upper yoke 14, when downward force is exerted on operating lever 15. A pair of torsion springs 60, 62 are coupled between a shaft 65 and pivot bracket 16, which is pivotally connected to upper yoke 14 by pivot pin 21. Torsion springs 60, 62 exert a torque force tending to hold operating lever 15 in an upwardly directed position. Torsion springs 60, 62 act in opposition to the downward force caused by the weight of the dividing and rounding section 12 which is attached to drive rack 17.

Figure 5:
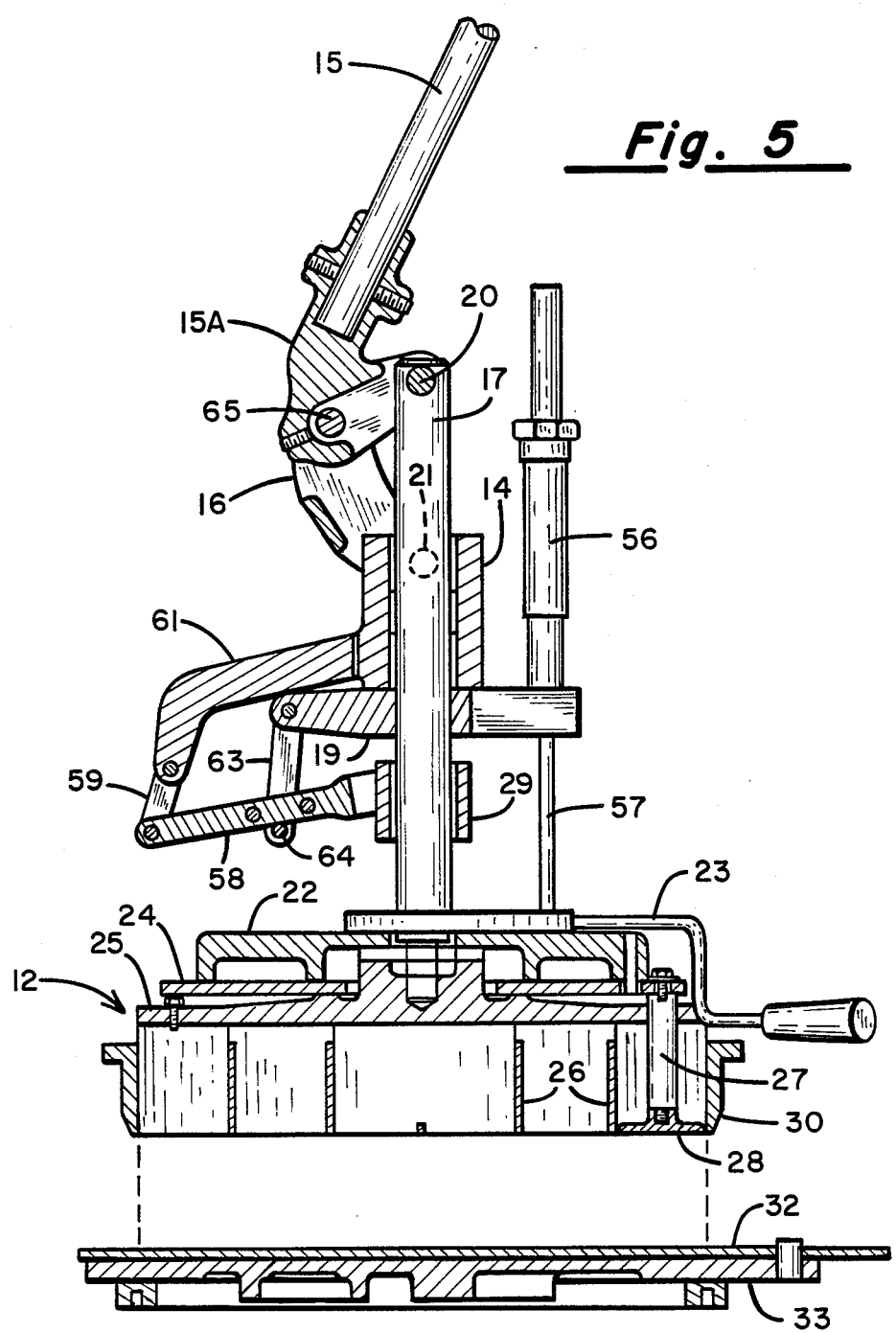
FIG. 5 is a cross-sectional view taken along the centerline 5—5 of FIG. 4, with the dividing assembly in its uppermost position.
Figure 6:
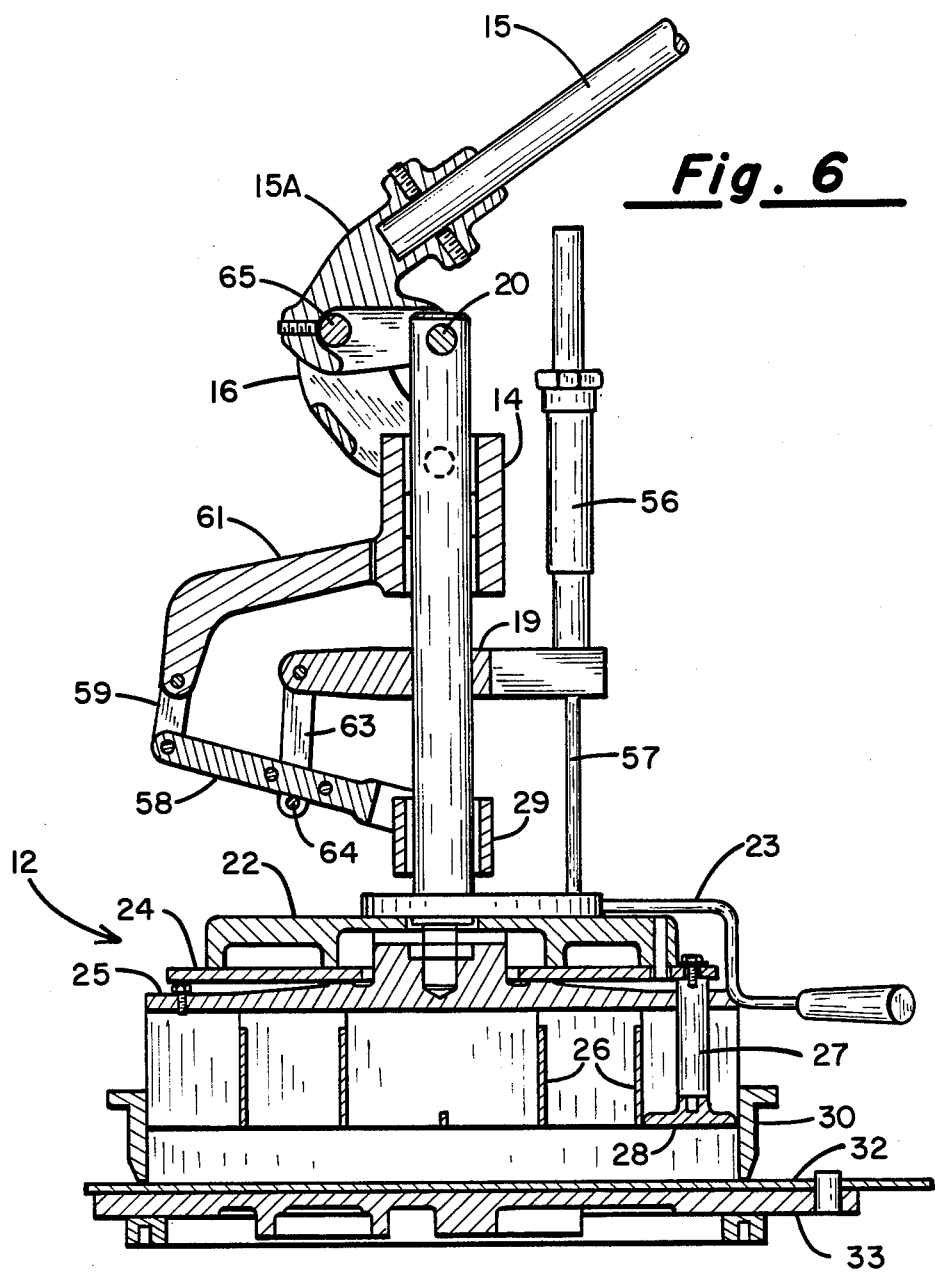
FIG. 6 is a side cross-sectional view as shown in FIG. 5, with the ring in a lowered position and dividing assembly in an intermediate position.
Figure 7:
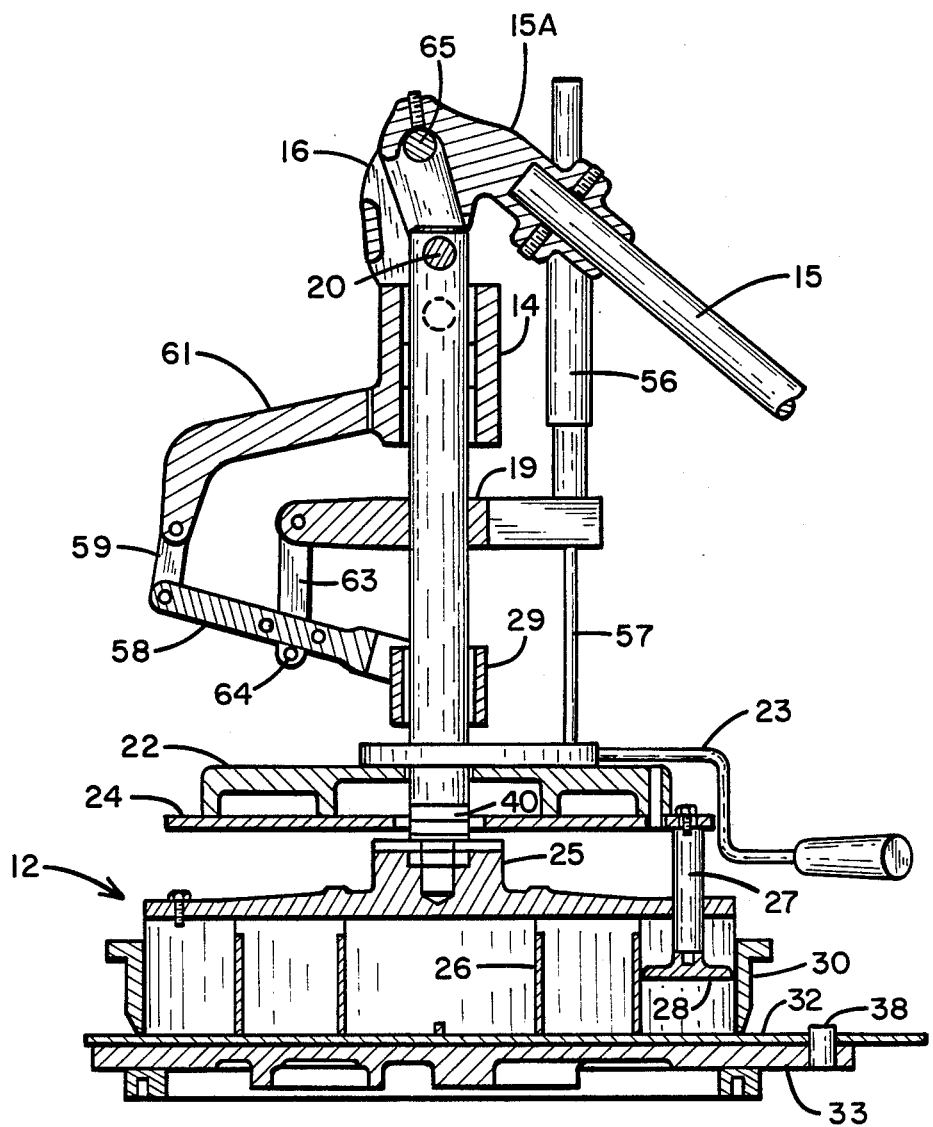
FIG. 7 is the cross-sectional view of FIG. 5, with the ring and divider assembly in its lowest position.

Glides 18 are affixed to the trip plate 22, and are slidably glided through upper yoke 14 and through ring yoke 29. Ring yoke 29 is slidably fitted about drive rack 17 to permit relative movement therebetween. Reference to FIGS. 5-7 will more clearly illustrate the relative linkages between the respective moving components of upper yoke section II and dividing and rounding section 12. Each of these figures show a side cross-section view of the dividing and rounding section taken along the line 5—5 of FIG. 4, in respective different positions.

FIG. 5 shows operating lever 15 in its upwardmost position, with dividing and rounding section 12 held spaced away from pallet 32 and crank plate 33. In this position, ring-lifting mechanism 19, which is affixed to drive rack 17, abuts against the lower edge of upper yoke 14. Ring pivot mechanism 19 has a suspension bracket 63 pivotally attached proximate a rear end, and suspension bracket 63 has a lower pin 64 which supports a ring yoke lever 58. Ring yoke lever 58 is pivoted at its rear end via a swing bracket 59 to a rearwardly extending yoke brace 61, which is affixed to upper yoke 14. The forward end of ring yoke lever 58 is pivotally connected to ring yoke 29. Ring yoke 29 is therefore held upwardly by the supporting action of suspension bracket 63 and pin 64.

FIG. 6 shows operating lever 15 in a relatively downward position relative to FIG. 5, wherein the dividing and rounding section 12 is moved closer to pallet 32. In this view, ring 30 is lowered into contact against pallet 32. The relative lowering of ring-lifting mechanism 19, and suspension bracket 63 which is pivotally attached thereto, permits ring yoke lever 58 to be lowered, thereby lowering ring yoke 29. Since ring yoke 29 is attached to ring 30, as shown in FIG. 4, this permits ring 30 to become lowered against pallet 32. It should be noted that trip plate 22 is supported by ring-pivot mechanism 19 via a rod 57 which is connected at one end to trip plate 22 and at its other end to a compression spring assembly 56. Compression spring assembly 56 contains a compression spring coupled to rod 57, to produce an adjustable uplift force on trip plate 22 and plug plate 24 during rounding. In the position of operating lever 15 as illustrated in FIG. 6, the dividing and rounding section 10 is in a position to compress dough beneath the knives 26 and plugs 28, and ring 30 is positioned to confine the dough within its perimeter for this operation.

FIG. 7 illustrates the apparatus with operating lever 15 at its lowest position, and with trip lever 23 released, to thereby permit the knife blades 26 to pass downwardly into contact against pallet 32. The release of trip lever 23 permits a relative separation between trip plate 22 and knife plate 25. This in turn permits knife plate 25 to move downwardly relative to the position of plugs 28, to cut the dough pressed beneath plugs 28 into predefined-sized pieces.

FIG. 8A shows a front elevation view and partial cross section, to illustrate the relative engaged positions of trip plate 22, plug plate 24 and knife plate 25, when trip bar 23A is engaged into trip groove 40. In this position, upward and downward movement of drive rack 17 will cause corresponding upward and downward movement of all of these engaged components. Cutting blades 26 are respectively held flush with the undersurfaces of plugs 28, thereby forming a relatively smooth undersurface for dividing and rounding section 12. FIG. 8B shows the relative disengaged position of knife plate 25 from trip plate 22 and plug plate 24, when trip bar 23 is released from locking engagement with trip groove 40. In this position, downward movement of drive rack 17 causes corresponding downward movement of knives 26 attached to plate 25, to cut through the dough which is compressed beneath the undersurface of dividing and rounding section 12. Plugs 28 are supported atop the dough, and knives 26 penetrate downwardly through the dough, until knives 26 contact the pallet 32.

In operation, the dough is placed on the pallet 32 and the pallet 32 is then placed on crank plate 33 by aligning pallet 32 with the locating pin 38. The operator then pulls down on operating lever 15 to rotate pivot bracket 16 which moves the first pivot means 20 and pushes downwardly on the drive rack 17. As the drive rack 17 is pushed downwardly, the entire dividing and rounding section 12 moves downwardly to a position a few inches above the dough on the pallet 32. Further downward movement of operating lever 15 rotates the second pivot means 21 which in turn lowers ring yoke 29 and ring 30. As the second pivot means 21 is rotated, the ring 30 contacts pallet 32 to form an outer circumferential border for the dough. Further downward movement of the operating lever 15 lowers a dividing and rounding section 12 of the dividing and rounding machine 10 until the dough is evenly flattened. This is accomplished by pressing the false bottom surface created by the knife blades 26 and plugs 28 against the dough on pallet 32 and the inner surface of the ring 30. Once the dough has been flattened, lever 23 is pivoted horizontally to disengage trip bar 23A from the trip groove 40, to thereby disengage the drive rack 17 from the trip plate 22. Once the drive rack 17 is disengaged, further downward pressure on the operating lever 15 pushes the knife plate 25 and knife blades 26 downwardly beyond the lower surface of the plugs 28 to divide the dough into equally-sized pieces.

After the dough is divided, the operator begins the rounding process by pulling the rounding lever 35 forward. The rounding lever 35 then causes the motor to engage the variable crankshaft. The variable crankshaft and motor operate to eccentrically rotate the crank plate 33. Rotation of the crank plate 33 also causes the pallet 32 to eccentrically rotate while the dough remains within the various openings created by the knife blades 26. Continued rotation of the dough and pallet 32 causes the dough to form dough balls of equal size and shape which may then be baked and used as rolls or buns.

The design of the present invention allows for the removal and cleaning of all of the components of the dividing and rounding machine 10 which contact the dough. The following step-by-step procedure is described to illustrate the ease with which the present invention may be cleaned or adapted for the production of dough balls having a different weight, quantity or shape, by interchange with other dividing assemblies.

Typically, the ring 30 is removed first. This is accomplished by pulling down on the operating lever 15 until the ring 30 contacts the pallet 32. The operating lever 15 is then raised slightly so that the ring 30 may be rotated until the ring slots 46 are aligned with the ring grooves 31 on the arms 45 of the ring yoke 29. Next, the operating lever 15 is raised and the ring 30 is removed from the pallet 32.

The next step in removing the elements of the dividing and rounding machine 10, is to remove the dividing assembly from the dividing and rounding section 12. This is accomplished by loosening knobs 39 on the trip plate 22 until the trip plate 22 is no longer attached by knobs 39, pulling down on the operating lever 15 until the false bottom surface of the dividing assembly contacts the palate 32. Next, the dividing assembly is rotated one-fourth turn to release the locking slot 51 on the lower section 50 of the drive rack 17 from the cross key 52 on the upper section 49 of the drive rack 17. Finally, the operating lever 15 is raised to lift the upper section 49 away from the divider assembly. The dividing assembly is then removed from the dividing and rounding machine 10.

The last component to be removed from the dividing and rounding machine 10 is the pallet 32. The pallet 32 is removed from the dividing and rounding section 12 by merely lifting the pallet 32 off the locating pin 38.

It is anticipated that the present invention is readily adaptable to machines that perform only the dividing function of the present invention and that various modifications may be made to the present invention by those skilled in the art without avoiding the scope of the present invention as defined by the claims attached hereto.

What is claimed is:

1. An improvement in a dividing and rounding machine of the type having a dividing and rounding assembly connected to a drive rack which is vertically guidable through an upper yoke positioned above a crank plate which may be horizontally oscillated, wherein the improvement comprises (a) a drive rack mechanism comprising a first link pivotally attached to said upper yoke and a pivot bracket and operating lever pivotally attached to said drive rack, and torsion spring means for connecting said first link to said pivot bracket to urge said drive rack to an upwardly position, said drive rack having a downwardly extending keyed end portion; and (b) a dividing and rounding assembly having an upper receptacle for receiving said drive rack keyed end portion, including means for releasably connecting to said drive rack.

2. The apparatus of claim 1, wherein said dividing and rounding assembly further comprises a knife plate affixed to a plurality of downwardly directed knives, said upper receptacle for receiving said drive rack keyed end portion being affixed to said knife plate.

3. The apparatus of claim 2, further comprising a ring yoke movably positioned about said drive rack, said ring yoke being supported by said drive rack, and having a pair of downwardly directed arms extending about said dividing and rounding assembly; and wherein said dividing and rounding assembly further comprises an outer ring releasably attachable to said arms.

4. The apparatus of claim 3, wherein said downwardly directed arms each further comprise a groove facing toward said ring, and said ring further comprises an outer flange having a pair of notches therethrough, each notch sized to receive an arm, and said grooves being sized to receive said outer flange.

5. The apparatus of claim 2, wherein said dividing and rounding assembly further comprises a plurality of plugs slidably fitted between respective knives, said plurality of plugs being affixed to a plug plate which is releasably attached to said drive rack.

6. The apparatus of claim 5, wherein said dividing and rounding assembly further comprises a trip plate releasably attached to said plug plate.

7. The apparatus of claim 6, wherein said drive rack further comprises a trip groove and said trip plate further comprises a trip bar which is movably engageable into said trip groove.

8. The apparatus of claim 7, further comprising a trip lever attached to said trip bar.

9. A dividing and rounding machine for compressing, dividing and rounding dough and the like into substantially equal size subdivisions, comprising (a) a machine base supporting a horizontal crank plate, including means for eccentrically moving said crank plate on said base;

(b) an upper yoke affixed to said base and extending upwardly over said crank plate;

(c) a movable drive rack assembly attached to said upper yoke, said drive rack assembly, having a downwardly extending shaft passing through said upper yoke, and said shaft having a keyed attachment member at its lower end;

(d) a dividing assembly having an upper keyed engagement member removably connectable to said keyed attachment member, said dividing assembly having a ring slidably fitted about its periphery;

(e) a ring yoke positioned beneath said upper yoke and slidably mounted about said drive rack assembly shaft, said ring yoke having downwardly extending legs and means for removably attaching said legs to said dividing assembly peripheral ring; and (f) first means for vertically moving said drive rack shaft, and second means for moving said ring yoke, into contacting relation with said crank plate.

10. The apparatus of claim 9, wherein said shaft keyed attachment member further comprises a projecting head having a width narrower than its length, and said dividing assembly upper keyed engagement member further comprises a slotted opening sized to receive said head in one head orientation and to capture said head in another head orientation, relative to said shaft.

11. The apparatus of claim 10, wherein said means for removably attaching said ring yoke legs to said ring further comprises a flange engageable in a slot.

12. The apparatus of claim 11, wherein said dividing assembly further comprises a knife plate having a plurality of downwardly directed blades, and a plug plate affixed to a plurality of plugs between said blades.

13. The apparatus of claim 10, wherein said dividing assembly further comprises a knife plate affixed to said upper keyed engagement member, said knife plate having a plurality of downwardly directed blades.

14. The apparatus of claim 13, wherein said knife plate has a plurality of openings, and further comprising a plug plate overlying said knife plate, said plug plate having a center opening larger than said upper keyed engagement member and having a plurality of downwardly projecting plug stems through said knife plate plurality of openings, the lower ends of each of said plug stems being attached to a plug, each of said plugs having a surface area substantially filling the area between adjacent blades.

15. The apparatus of claim 14, further comprising means for releasably attaching said plug plate to said drive rack assembly shaft.

16. The apparatus of claim 15, wherein said means for releasably attaching said plug plate to said drive rack assembly shaft further comprises a transverse slot in said shaft and a movable bar engageable in said slot, said movable bar being pivotally attached to a trip plate connected to said plug plate.

17. The apparatus of claim 16, further comprising means for removably attaching said trip plate to said plug plate.

18. The apparatus of claim 17, further comprising guide bars attached to said trip plate, said guide bars slidably coupled through said upper yoke.

19. The apparatus of claim 9, wherein said second means for moving said ring yoke further comprises an arm pivotally attached to said upper yoke, and a swingable suspension bracket pivotally attached to said movable drive rack assembly, said arm being connected to said ring yoke and being supported by said swingable suspension bracket.

20. The apparatus of claim 19, wherein said swingable suspension bracket further comprises a U-bracket suspended from said movable drive rack assembly, the lower portion of said U-bracket passing beneath said arm pivotally attached to said upper yoke.

21. The apparatus of claim 20, further comprising a removable pallet plate overlying said crank plate.

* * * * *